UNITED STATES PATENT OFFICE.

GEORG DONAUER, OF TRIESTE, AUSTRIA-HUNGARY, ASSIGNOR TO THE FIRM OF ERSTE TRIESTER REISSCHÄL-FABRIKS-AKTIEN-GESELLSCHAFT, OF TRIESTE, AUSTRIA-HUNGARY.

MANUFACTURE OF SIZING OR FINISHING MEDIUMS.

972,068.

Specification of Letters Patent. Patented Oct. 4, 1910.

No Drawing. Application filed July 9, 1909. Serial No. 506,832.

*To all whom it may concern:*

Be it known that I, GEORG DONAUER, in the firm Erste Triester Reisschäl-Fabriks-Aktien-Gesellschaft, residing at Via Romagna 134, Trieste, Austria-Hungary, a subject of the King of Bavaria, have invented new and useful Improvements in the Manufacture of Sizing or Finishing Mediums, of which the following is a specification.

This invention relates to a process of manufacturing sizing or finishing media, which process represents an important development and improvement of the process described in the U. S. Patent No. 849,413. The characteristic of the invention described in the U. S. Patent No. 849,413 consists in that starchy or glutinous substances or an artificial mixture of starch and gluten, preferably rice rich in gluten or ordinary rice mixed with gluten, is first moderately steamed so as to loosen the tissue and then mixed with substances having an alkaline reaction, so as to separate the proteins, and is finally mixed with a solution of an organic acid. The product is then dried at a temperature under 100° centigrade and the dried product ground to powder. For separating the proteins ammonium carbonate is preferably used; but other alkaline substances may be employed, such as soda, lime, chalk, barytes. As the organic acid, lactic acid has been found to be preferable.

Whereas the process carried out in accordance with Patent No. 849,413 only allows of obtaining thickly liquid or viscid solutions, the employment of which is in many cases not suitable, very thin solutions may be obtained by the hereinafter described process, which solutions retain the specific and excellent properties of the product manufactured according to Patent No. 849,413. The process described hereinafter, for instance, has important technical advantages over the use of dextrin obtained from potato starch, inasmuch as the new process gives the goods a pronounced natural soft and cloth-like feel to the touch; further the colors are not nearly so strongly attacked as when any other starches are used; and finally a much greater economy is the result than is possible with other brands of starch, inclusive of potato starch, which are opened up or converted partly into dextrin according to the known process.

The new process constitutes, besides having the advantage of great economy, substantial technical progress in the sizing or finishing industry, and the process is used with advantage in all cases where either very thin solutions or solutions such as are produced by vegetable glue in water are required.

The characteristic feature of the new process consists in this that the product obtained according to the U. S. Patent No. 849,413 is subjected to the known treatments which are used for converting starch into sugar, dextrin or vegetable glue or gum, or into products similar to sugar, dextrin or vegetable glue. Such treatments, by means of which starch is converted into one of the products mentioned above, are, for instance, the treatment of the starch with acids (mineral or organic acid) with acid salts and subsequent neutralization of the acid by a suitable alkali, further treatment with ferments and enzymes which have the property of inverting starch, as for example, diamalt, "diastaphor" and the like, and finally treatment of the starch with a strong alkali, such as soda lye or the like and the final neutralization by a suitable acid, thus obtaining the so-called vegetable glue or gum.

If the product obtained according to Patent No. 849,413 is subjected as already stated, to the treatments referred to above a final product will be obtained which is easily soluble in water in a specific manner and which retains the valuable properties of the original product obtained according to Patent No. 849,413.

In Patent No. 849,413 rice as well as other substances containing starch and protein may be used as starting or primary materials. The best results are obtained according to the new process if a material is used as primary product, which is obtained according to Patent No. 849,413, rice being used as primary material. In Patent 849,413 the process of manufacture is described in an example as follows:—The grains of rice, after being moderately steamed are then treated with a 50 per cent. solution of ammonium carbonate (one part ammonium carbonate to 20 parts of the protein contained) and afterward with a solution of lactic acid (2 parts of anhydrous lactic acid to 8 parts of protein contained) and are finally dried and ground. The product so obtained which gives an acid reaction is neutralized with soda, when used in the manner usually adopted in the dressing and finishing industry. A perfectly neutral product, however, can be obtained if such quantities of lactic acid are used during the process described above, which are just sufficient to neutralize the ammonium carbonate still to be found. Such will be the case, for instance if one part of ammonium carbonate is used for every eight parts of protein contained, and two parts of anhydrous lactic acid for every twenty parts of protein.

Examples of carrying out the process are given herewith:—

1. Treating the product obtained according to Patent No. 849,413 with sulfuric acid and with subsequent neutralization of the acid by an alkali:—The following treatment with sulfuric acid has been found very suitable. 10 kg. of the product produced in accordance with Patent No. 849,413 are put in a double-walled boiler and stirred with 20 liters of water so as to form a uniform paste, and thereafter 10–30 liters of water are added, depending upon whether a thick or thin boiling product is required. About 300 cc. of sulfuric acid of 66° Bé. are then added in thin jets which sulfuric acid is to serve as opening up agent, the whole mixture being stirred while the acid is being added. Steam is then admitted and the product first of all thickens and becomes pasty, but changes later on into a thin liquid. As soon as the mixture begins to boil (which takes place after the expiration of about 10–15 minutes) it is left boiling for five minutes, thereafter the vessel emptied and the mass is neutralized with soda or soda lye. The mixture is well stirred during cooling.

2. Treatment of the product obtained according to Patent No. 849,413 with ferments or enzymes which have the property of inverting starch (for instance, "diastaphor"):—10 kg. of the product manufactured according to Patent No. 849,413 are mixed with 40 liters of water by stirring and 330 gr. of "diastaphor" dissolved in a liter of water are added; thereafter the whole is heated to about 65° C., allowed to stand for 10–15 minutes, and then boiled for 5–10 minutes. The sizing or finishing material is in a perfectly thin liquid condition and is ready for immediate use after having been neutralized, if required.

3. Treatment of the product obtained in accordance with Patent No. 849,413 with a strong alkali and subsequent neutralization by means of a suitable acid:—The product produced according to Patent No. 849,413 is treated in the cold with soda lye, in a similar manner to the treatment of starch, which is to be converted into vegetable glue or gum, and the solution is neutralized by means of sulfuric acid.

I claim:—

1. The process for manufacturing sizing or finishing media, which consists in steaming substances containing starch and gluten, then mixing the substance with a substance having an alkaline reaction, then mixing the product with a solution of an organic acid, and finally subjecting the product so obtained to treatment for the purpose of changing the constitution of the starch.

2. The process for manufacturing sizing or finishing media, which consists in steaming substances containing starch and gluten, then mixing the substance with a substance having an alkaline reaction, then mixing the product with a solution of an organic acid, and then subjecting the product so obtained to treatment with acids and alkalies.

3. The process for manufacturing sizing or finishing media, which consists in steaming substances containing starch and gluten, then mixing the substance with a substance having an alkaline reaction, then mixing the product with a solution of an organic acid, then treating the product so obtained with sulfuric acid, and finally neutralizing the mass with an alkali.

4. The process for manufacturing sizing or finishing media, which consists in steaming substances containing starch and gluten, then mixing the substance with a substance having an alkaline reaction, then mixing the product with a solution of an organic acid, then adding water to the mass so obtained so as to form a uniform paste, then treating the mass with sulfuric acid, treating the mass with steam, allowing to boil, and finally neutralizing the mass with soda.

5. The process for manufacturing sizing or finishing media, which consists in steaming a substance containing starch and gluten, then mixing the substance with a solution of ammonium carbonate, then mixing the product with a solution of lactic acid, then drying the mass, adding water to the product so obtained with accompanying stirring so as to form a uniform paste, adding further quantities of water, treating the mass with sulfuric acid with accompanying stirring, treating the mass with steam, allowing to boil, neutralizing the mass with soda, and allowing to cool while stirring.

In testimony whereof I affix my signature in the presence of two witnesses.

GEORG DONAUER.

Witnesses:
  VINCENT BURES,
  HENRY LOWE.